(Model.)
S. JONES.
Steam Coffee and Tea Pot.
No. 231,586.          Patented Aug. 24, 1880.
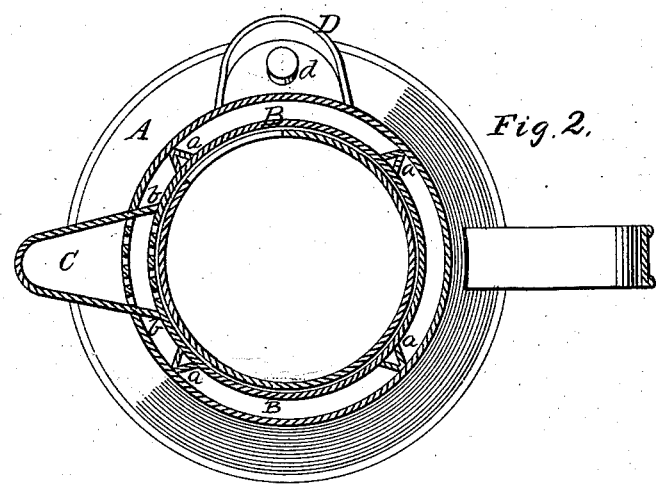
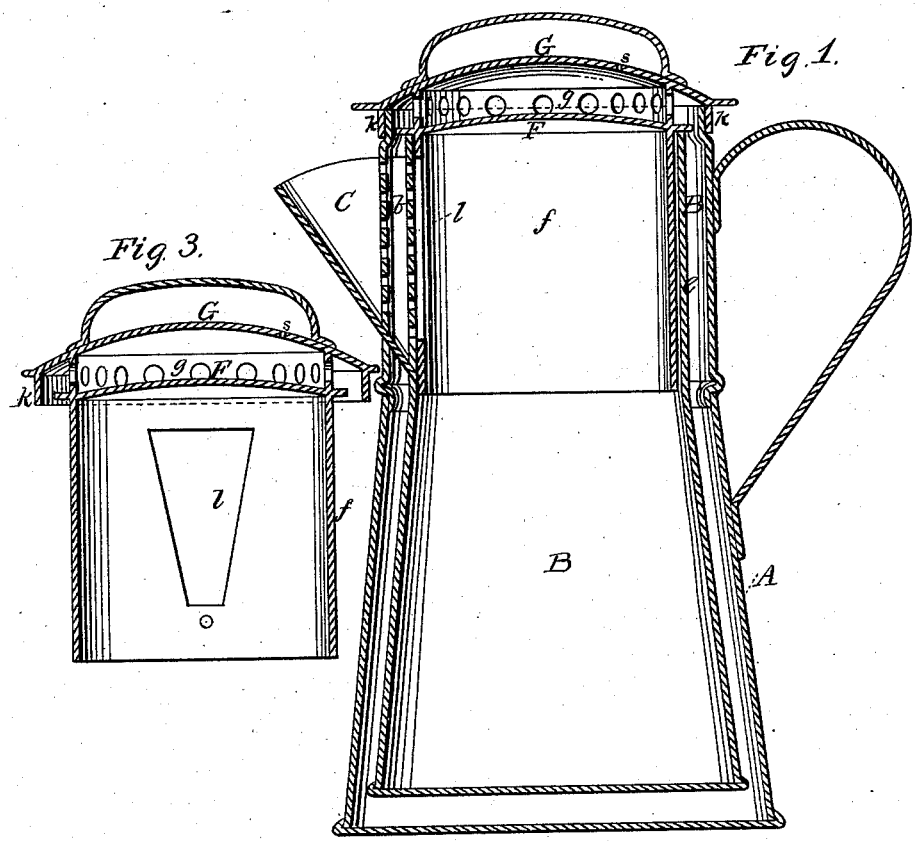
WITNESSES:
Villette Anderson,
Phil. C. Masi.
INVENTOR:
Samuel Jones,
by E. W. Anderson,
his ATTORNEY.

UNITED STATES PATENT OFFICE.

SAMUEL JONES, OF LINCOLN, ILLINOIS.

STEAM COFFEE AND TEA POT.

SPECIFICATION forming part of Letters Patent No. 231,586, dated August 24, 1880.

Application filed August 3, 1880. (Model.)

*To all whom it may concern:*

Be it known that I, SAMUEL JONES, of Lincoln, in the county of Logan and State of Illinois, have invented a new and valuable Improvement in Steam Coffee and Tea Pots; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical central section of this invention. Fig. 2 is a horizontal section, and Fig. 3 is a detail view, in section, of the double-wall cover and flange.

The object of this invention is to provide a pot for making coffee by steam-heat, which will prevent the loss of the aroma during the operation.

It consists in the construction and novel arrangement of a double-wall vessel, forming an outer water-tank and an inner coffee-pot, having independent spouts, and a double-wall cover fitting both the tank and the inner pot, and having an extended cylinder-flange fitting into the upper cylindrical part of the coffee-vessel and slotted on one side, thereby forming a cut-off, and providing a passage to the discharging-spout of said vessel, as hereinafter shown and described.

In the accompanying drawings, the letter A designates the outer or water vessel, to which is attached, by suitable interior supports, $a$, as well as the nose or spout-wall $b$, an internal vessel, B, in which the coffee decoction is made. The walls of these vessels are designed to be parallel, or nearly so, and the margin or edge of the top of the inner vessel is arranged a little lower than that of the outer or water vessel.

C represents the spout of the coffee-pot, which extends through the wall of the outer vessel, with whose chamber it does not communicate.

The outer vessel is provided with an independent spout, D, on the side at a somewhat lower level, this spout having a stopper, $d$.

The upper portion, $e$, of the coffee-vessel is cylindrical in form, extending below the lower end of the spout, and is designed to engage with the cylinder-flange $f$ of the inner cover, F, of the double-wall top, which has also an outer cover, G, of larger diameter, supported above the inner cover by a perforated or open-work band or hoop, $g$, which connects the two covers.

The outer cover has a flange or rim, $k$, which engages with the marginal bearing of the outer or water vessel and closes it tightly. The long cylinder-flange of the inner cover, being inserted into the upper cylindrical portion of the inner vessel at the same time, closes this vessel. This cover-flange $f$ is slotted on one side, as shown at $l$, to afford communication with the discharging-spout of the coffee-vessel when required, but while the coffee is being made this slot is carried to one side by turning the cover and flange so as to close the inner vessel completely by cutting off the spout-communication.

It is apparent that there are now two parallel walled vessels, whereof the inner or coffee vessel is completely closed and the outer or water vessel nearly so, a small steam-opening, $s$, being left in the cover G.

The coffee and water for the decoction are placed in the inner vessel and the water for steaming in the outer tank, being usually poured in through its spout, which is then stoppered. Heat being applied, the steam passes all around and over the inner vessel by means of the space between the vessel-walls and cover-walls. When the coffee is made the water of the steaming-vessel may be poured off through its side spout and the coffee poured through the spout of the coffee-pot, the cylinder-flange of the cover being first turned to bring the slot $l$ to the spout.

Having described this invention, what I claim, and desire to secure by Letters Patent, is—

1. A steam coffee-pot consisting of an outer water-vessel and an inner coffee-pot, having parallel, or nearly parallel, walls and independent spouts, and a double-wall cover fitting both water-vessel and inner coffee-vessel, and having an extended cylinder-flange from the coffee-pot cover fitting into the upper cylinder portion of the inner coffee-pot to form a spout cut-off, the cylinder-flange being slotted on one side to communicate with said spout when turned, substantially as specified.

2. A steam coffee-pot consisting of connected outer and inner walls, forming outer and inner vessels, A and B, the latter having its upper portion cylindrical, said vessels having independent spouts, and outer and inner covers connected by a perforated support, and having engaging-flanges for the respective vessels, the flange of the inner cover being slotted and extended into the cylinder of the coffee-pot to form a cut-off, substantially as specified.

In testimony that I claim the above I have hereunto subscribed my name in the presence of two witnesses.

SAMUEL JONES.

Witnesses:
WILFORD D. WYATT,
CHARLES I. FORSYTH,
CHARLES K. WILLS.